US008467773B1

(12) United States Patent
Soelberg et al.

(10) Patent No.: US 8,467,773 B1
(45) Date of Patent: Jun. 18, 2013

(54) SYSTEM AND METHODS FOR PRE-CACHING BROADCAST CONTENT FOR MERCHANDISING ON A WIRELESS MOBILE DEVICE

(75) Inventors: Emily Lyons Soelberg, Atlanta, GA (US); Mark Austin, Boynton Beach, FL (US); James Fraser Whitehead, Mercer Island, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 615 days.

(21) Appl. No.: 11/519,567

(22) Filed: Sep. 12, 2006

(51) Int. Cl.
*H04M 3/42* (2006.01)
*H04L 29/08* (2006.01)
*G06F 21/00* (2006.01)
*G06F 15/16* (2006.01)

(52) U.S. Cl.
USPC ........ 455/414.1; 455/414.4; 705/50; 709/219

(58) Field of Classification Search
USPC ................. 455/414.1; 705/901, 902, 904, 50, 705/14.4, 14.49, 14.64; 717/168, 172, 173, 717/174, 178
See application file for complete search history.

(56) References Cited

U.S. PATENT DOCUMENTS

| 5,557,320 | A | 9/1996 | Krebs | 348/12 |
| 6,526,335 | B1* | 2/2003 | Treyz et al. | 701/1 |
| 7,343,179 | B1* | 3/2008 | Theis et al. | 455/567 |
| 7,454,166 | B2* | 11/2008 | Patsiokas et al. | 455/3.06 |
| 2004/0209649 | A1* | 10/2004 | Lord | 455/558 |
| 2004/0260793 | A1* | 12/2004 | Ichikawa et al. | 709/219 |
| 2005/0091107 | A1* | 4/2005 | Blum | 705/14 |
| 2005/0130586 | A1 | 6/2005 | Gnuschke et al. | 455/3.06 |

OTHER PUBLICATIONS

Wagner, Annette "The Mobile Storefront: Let your fingers do the shopping," 2005, Designing for the User Experiences vol. 135, Article #45.*
Cornea, R., et al., "Managing cross-layer constraints for interactive mobile multimedia," *University of California*, Irvine, CA, no date available, 1-6.
Grebb, M., "The wireless information network laboratory finds itself at the center of an industry increasingly eager to capitalize on university research," *The Rutgers University Winlab*, 2003, http://www.thefeaturearchives.com/topic/Technology/The_Rutgers_University_Winlab.html, downloaded from the Internet on Oct. 11, 2006, 1-5.
Irmak, U., et al., "Hierarchical substring caching for efficient content distribution to low-bandwidth clients," *WWW*, 2005, 11 pages.

* cited by examiner

*Primary Examiner* — Melody Mehrpour
*Assistant Examiner* — Natasha Cosme
(74) *Attorney, Agent, or Firm* — Woodcock Washburn LLP

(57) ABSTRACT

Systems and methods for providing users of wireless mobile devices with content available for purchase are disclosed. Content is loaded into a cache memory in the wireless mobile device and the user is provided with a preview of the content and the ability to purchase the content. If the user does not purchase the content, then the content is purged from the cache memory.

9 Claims, 2 Drawing Sheets

SYSTEM AND METHODS FOR PRE-CACHING BROADCAST CONTENT FOR MERCHANDISING ON A WIRELESS MOBILE DEVICE

FIELD OF THE INVENTION

This invention relates to content delivery to wireless mobile devices. More specifically, this invention is related to a system for using a broadcast network to deliver some content to a cache storage in a wireless device for the purpose of attracting a consumer to purchase content. The purchase may be handled by a request to the cellular network for the rights and confirming payment.

BACKGROUND OF THE INVENTION

Technical advances have pushed wireless technology into more mobile devices, opening up the marketplace for multimedia content in mobile devices. Consumers are demanding increasing levels of rich multimedia content, such as music, videos, ring tones, software, and games. Recent studies estimate that digital music will grow from 1.5 percent of all music sales in the US in 2004 to 25 percent by 2008. Other forms of digital content are also growing at comparable rates. Given these trends, it is inevitable that consumers will demand more elegant ways of enjoying the content they are acquiring.

Today, video clips of new events and trailers, entire movies, music, photographs, music videos, pod-casts, animated emails, educational multimedia content and much more are flooding the Internet and many consumers are downloading and saving this rich content. Especially with purchased content like music, games and movies, consumers want to be able to move content from device to device, and take it with them when they leave home. In today's mobile society, consumers balk at any limitations on where and when they might be able to experience their growing cache of rich multimedia content.

Unfortunately, several bottlenecks currently slow down the flow of multimedia content for most consumers. Practically all content must go through a personal computer, which must be cabled to other devices in order to transfer or share this content. As more wireless networks are deployed in homes and public places, and as WLAN technology is embedded into more CE products, consumers will come to expect access to their desired content through their wireless systems.

Wireless Mobile Devices.

Wireless mobile devices such as cell phones, personal digital assistants (PDAs), Pocket PCs, laptop computers or other wireless enabled electronic appliances have continued to evolve in functionality, and the services that can be accessed through those appliances have continued to multiply. Cell phones in particular have become a popular device for the delivery of multimedia content. Multimedia content includes audio, such as music and ring tones, video, text, graphics, software, facsimile, and telephony. Commercially available wireless mobile devices have sufficient computing capacity, memory and multimedia features to enable the display of audiovisual content and execution of software. A number of services make use of packet-switched data services and compression algorithms to deliver audio-visual content to wireless mobile devices.

Content Transmissions to Wireless Mobile Devices.

Systems that distribute and display multimedia content such as entertainment and advertising have been described in published patent literature. For example, United States Publication Number 2004/0209649 (published Oct. 21, 2004) discloses a SIM card to enable cell phone users to receive a multimedia broadcast of their choice. U.S. Pat. No. 5,557,320 discloses a sender-subscriber based, transmission traffic control system for video mail, which includes the transmission of bulk electronic data primarily in the form of still or motion picture images, with or without audio track. United States Publication Number US2005/0130586, published Jun. 16, 2005, and owned by the assignee of the present invention discloses a personal base station (PBS) or mobile device having wireless video capability.

Content Transmission Technologies.

There are numerous solutions for the delivery of multimedia content to wireless mobile devices. At present there are three technologies being commercialized for the transmission of multimedia content to wireless mobile devices. "Content over Satellite" is a concept that utilizes the S-DMB standard to directly transmit a satellite feed to the wireless mobile devices. "Content over Broadcast" is based on the broadcasting handheld standard (DVB-H) that directly broadcasts to the wireless mobile devices. The wireless mobile devices incorporates a tuner to receive the broadcast signal. Another technology available for "Content over Broadcast" is Qualcomm's MediaFLO™ technology. "Content over Cellular" is an approach that is utilized by MobiTV and uses an Advanced Video Coding (AVC) also known as H264 or MPEG-4 Part 10 to compress the video. Content may be delivered at any bit rate, although presently bit rates of 60 Kbps, 95 Kbps or 128 Kbps are utilized. This technology incorporates a method to change the bit rate of the video stream based on the capacity of the cellular network. Another service that may be used to broadcast content is Multimedia Broadcast Multicast Service (MBMS). MBMS is a broadcasting service that can be offered via existing GSM and UMTS cellular networks. The infrastructure offers an option to use an uplink channel for interaction between the service and the user. MBMS implements multicast distribution though the core network instead of providing point-to-point links for each wireless mobile device. Alternately, Cell Broadcast may be utilized to broadcast content. Cell Broadcast is capable of broadcasting a single message directed to all wireless mobile devices in one or more radio cells.

Currently there are no commercial broadcast capabilities in US wireless networks. Today, if a cell phone user wants to purchase media such as a ringtone, song, game or graphic, there is no preview offered. While it is technically feasible, it isn't economical for carriers due to the one-to-one relationship for delivery and the expense associated. The content must be delivered to each individual user. Since most of the purchases are for the same "top" items, the same file is delivered multiple times across the network. Through the Open Mobile Alliance (OMA) standards, there are mechanisms for enabling users to preview songs or games through the use of "rights objects" which manage access to the media, but these only apply to media that have already been delivered to the device.

One way of delivering content to a wireless mobile device is to transfer the data through the wireless network. This has a cost disadvantage. For example, a user who downloads a 3 minute video (encoded at 128 kbps) would have to pay over $28 in transport fees (at $0.01 per KB, a standard in the industry for pay per use KB rates) unless they had a data plan with their wireless carrier.

There is a need for a cost effective technology that provides the user of wireless mobile device with an opportunity to preview content before making a purchase decision for the content. There is a need for a cost-effective technology for the delivery of the same purchased content to a plurality of wireless mobile devices.

SUMMARY OF THE INVENTION

The following summary is a simplified summary of the invention in order to provide a basic understanding of some of the aspects of the invention. This summary is not intended to identify key or critical elements of the invention or to define the scope of the invention.

One aspect of the invention is to provide a method for delivering multimedia content to a wireless mobile device by broadcasting full or sample amounts of content to a cache memory in the user's wireless mobile device before thereby providing the user with the opportunity to preview the content before making a purchase decision. Digital rights management is provided so that content is not displayed unless it has been authorized by the subscriber.

Another aspect of the invention is a wireless mobile device capable of displaying multimedia content that includes a content access subsystem that sends information about the wireless mobile device and selected multimedia content to a wireless network and receives an authorization key associated with selected items of multimedia content.

DETAILED DESCRIPTION OF ILLUSTRATIVE EMBODIMENTS

Figure 1:
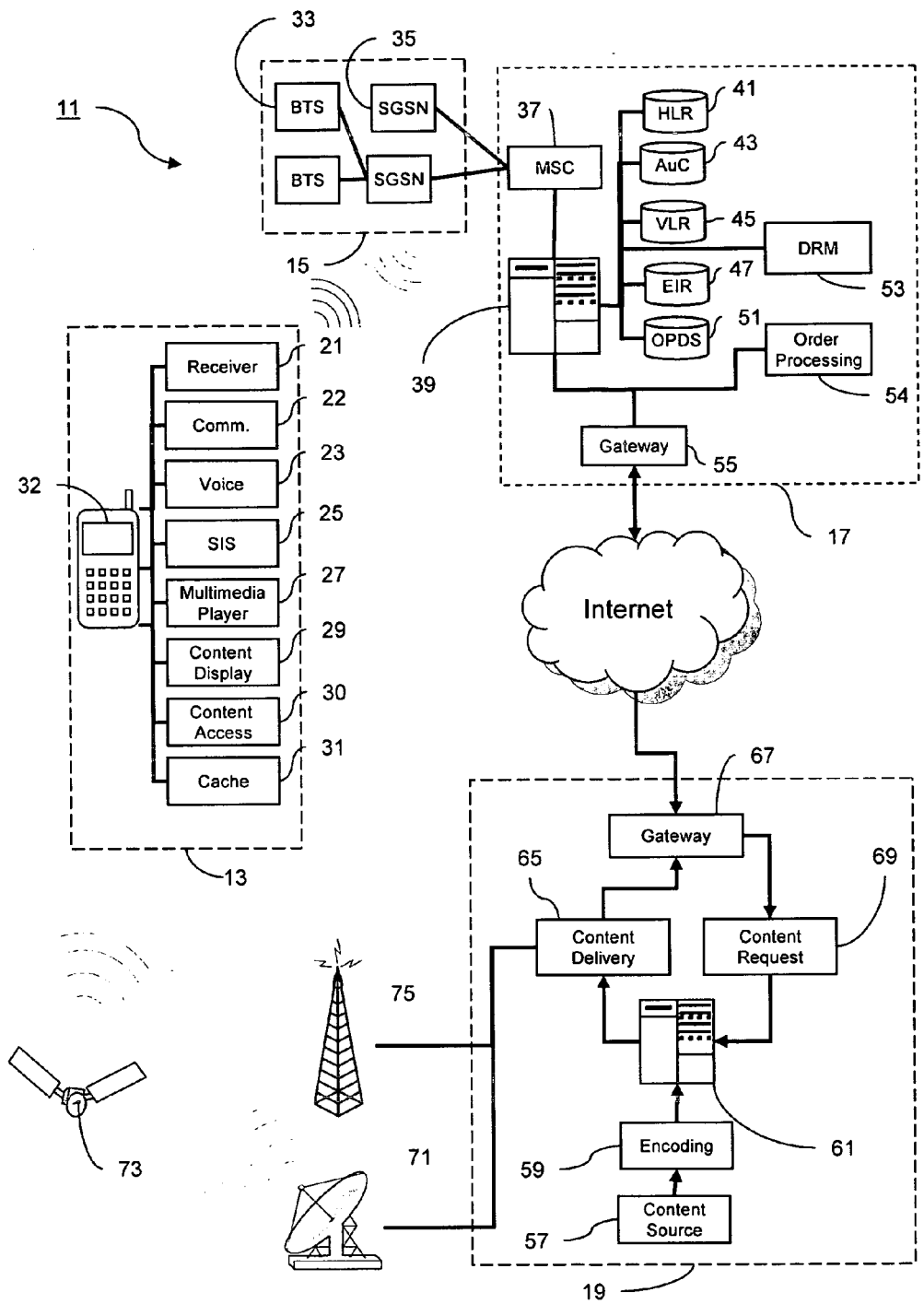
FIG. 1 illustrates a system for using a broadcast network to deliver content to the cache of a user's wireless mobile devices.

Illustrated in FIG. 1 is a content delivery system 11 for use in the delivery or display of multimedia content to a plurality of wireless mobile devices 13 in accordance with the present invention. A typical mobile communications system includes a plurality of wireless mobile devices 13, a base station subsystem 15, and a network subsystem 17. Multimedia content may be provided through a broadcast content delivery subsystem 19.

The components described in FIG. 1 for the base station subsystem 15 and network subsystem 17 are illustrative of just one example of a cellular network. There are a number of different digital cellular technologies that have been developed and are presently commercially employed. These technologies include: Global System for Mobile Communications (GSM), General Packet Radio Service (GPRS), Code Division Multiple Access (CDMA), Evolution-Data Optimized (EV-DO), Enhanced Data Rates for GSM Evolution (EDGE), UMTS, HSDPA, Digital Enhanced Cordless Telecommunications (DECT), Digital AMPS (IS-136/TDMA), and Integrated Digital Enhanced Network (iDEN). Although these technologies may employ different components, it would be readily apparent to one of ordinary skill in the art that the systems and methods described below could be employed with any of the wireless technologies.

The wireless mobile devices 13, (e.g. a cell phone) includes a number of subsystems to enable the device to function both as a communication device and a multimedia display device. The wireless mobile devices 13 include a receiver 21 that is capable of receiving broadcast content. The wireless mobile devices 13 include a communications subsystem 22 to facilitate wireless communication with external systems. The mobile wireless mobile devices 13 may also include a voice subsystem 23 to facilitate voice communications through the wireless mobile devices 13. A subscriber identity system (SIS) 25 such as described in United States Publication Number US2005/0130586 may be included. The SIS 25 may include a subscriber identity module (SIM or U/SIM card). The SIM is a smart card that securely stores a key identifying a mobile phone service subscriber, as well as subscription information, preferences and text messages. The SIM is in effect a microprocessor and storage device that is able to execute certain functions stored in the storage device. A multimedia player 27 that enables the wireless mobile devices 13 to process multimedia transmissions and display multimedia content on a wireless mobile devices screen 32 is also included. An example such a media application would be a Java applet commercially available from MobiTV® or other multimedia content providers. The wireless mobile devices 13 also includes an application that may include a content display subsystem 29 that may list the content available through the wireless mobile devices 13.

The wireless mobile device 13 may include a content access subsystem 30 that provides some of content purchase and digital rights management processing related to the content. Digital rights management (DRM) is one of a number of technologies available to control access to digital content. A typical DRM solution lets a content provider set and keep track of how the content is used (i.e., whether it's viewed, printed, copied, or forwarded). DRM also allows the content provider to set the conditions for granting access and accepting payment for content; and may provide limits to the number of times it can be viewed, or the period of time for which it can be viewed. The enforcement of the rules typically employs some sort of encryption platform that encrypts and packages the content and opens it upon receiving a valid key. Dispensing keys to the public—and processing the financial transaction—is part of the service that a rights clearinghouse typically offers.

The wireless mobile devices 13 also includes a cache memory or content storing subsystem 31 where broadcast content can be stored until the user is ready to preview it. A computer cache is a place to temporarily store information in a computer. Many computer users are familiar with the files that are stored on the user's hard disk when accessing a Web page. Those files are stored in a cache subdirectory under the directory for the user's browser. When the user returns to a page that was recently accessed, the browser retrieves it from the cache rather than the original server. This saves time and bandwidth. A cache may be created in any of a number of storage devices in a network, computer, or other electronic device. For example, a cache may be created on a storage device in a local server, on a computer's hard disk, in a reserved area of RAM, on a separate chip, or on the same chip as the microprocessor.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a central processing unit, the central processing unit becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

In a typical wireless cellular system the exchange of data between the wireless mobile devices and the wireless cellular network are accomplished utilizing one of a number of standard formats through the wireless network including base station subsystem 15 and network subsystem 17. In an exemplary system, a typical base station subsystem 15 includes a plurality of base transceiver stations (BTS) 33 serving GPRS (General Packet Radio Service) Support Node (SGSN) 35. GPRS is a data transmission technique that does not need to set up a continuous channel from a portable terminal for the transmission and reception of data, but transmits and receives data in packets. It makes very efficient use of available radio spectrum. The BTS 33 houses the radio transceivers that define a cell and handle the radio link protocol with the wireless mobile devices 13. The SGSN 35 manages the radio resources for one or more BTS devices 33 as well as radio channels set up, frequency hopping, and handovers. The SGSN 35 connects the wireless mobile devices 13 with the mobile service switching center (MSC) 37 of the network subsystem 17.

One component of the network subsystem 17 is the MSC 37. The MSC 37 acts as a switching node and additionally provides all of the processes needed to handle a wireless mobile device 13, such as registration, authentication, location updating, handovers, and call routing. Also included in the network subsystem 17 would be one or more processing units 39 such as a server. Information from the MSC 37 is processed by the processing unit 39. Also accessible by the processing unit 39 is a home location register (HLR) 41. The HLR 41 is a database that contains data relating to the local subscriber and may include subscriber information such as directory number, electronic serial number of the wireless mobile devices 13, and services or features the subscriber is assigned. The network subsystem 17 also includes an authentication center (AuC) 43. The AuC 43 is used during initial access to authenticate the user by means of a secret key. The AuC 43 contains a unique key (code) for each subscriber and network. The wireless mobile device 13 maintains a copy of this key within the SIS 25. A wireless mobile devices 13 attempting to log on to the network is sent a copy of a random number by the AuC 43. The key within both the SIS 25 and the AuC 43 transform the number using the key. The number produced by the SIS 25 is returned to the AuC 43 and if that number is the same the wireless mobile devices 13 is validated and is allowed access to the network. The network subsystem 17 also includes a visitor location register (VLR) that includes information from the HLR 41 necessary to deliver the subscribed services and control the calls for each wireless mobile devices within a specified geographical area. Another database included in the network subsystem 17 is the equipment identity register (EIR) 47. The EIR 47 contains a list of all valid wireless mobile devices 13 on the network.

Also included in the network subsystem 17 is a content order processing data store (OPDS) 51. The OPDS 51 is a data base containing: information provided by the wireless mobile device 13 relating to the wireless mobile device 13; content associated with the wireless mobile 13 device and; rights associated with the contents for the wireless mobile device 13.

Information from the OPDS 51 would be processed by a digital rights management (DRM) subsystem 53 that provides the wireless mobile device with instructions relating to content authorized for display through the device. The network subsystem 17 may also include an order processing subsystem 54 that would handle the data processing for subscriptions and content orders from the wireless moblie device 13.

In one embodiment, broadcast content may be provided by the broadcast content delivery subsystem 19, as illustrated in FIG. 1. A content source subsystem 57 provides content to an encoding subsystem 59. The encoding subsystem 59 reformats the content data using a format compatible with the format used by the receiver 21 of the wireless mobile device 13. Additionally, the encoding subsystem 59 may provide the appropriate digital rights management encryption to ensure that only users who purchase the entire content are able to display the entire continent. The broadcast content delivery subsystem 19 may include a computer device 61, such as a server, for executing software associated with the encoding subsystem 59, and for communicating with the network subsystem 17 through a gateway 67. The computer device 61 may also control the content delivery subsystem 65 and a content request subsystem 69. The content request subsystem 63 processes requests for content from the network subsystem 17 and/or the user of the wireless mobile devices 13.

Broadcast content may be provided for cache storage in a wireless mobile device 13 by though terrestrial broadcasts using the Digital Video Broadcasting—Handheld (DVB-H) standard or satellite broadcasts using the (S-DMB) standard. Transfer of content may be accomplished via a satellite system including a satellite dish 71, communicating to a satellite 73 which then broadcasts to the wireless mobile devices 13. Alternately the content may be broadcasted through a terrestrial broadcast station illustrated by tower 75. In this case transfer of the content such as an audiovisual work would be broadcast in the area where the wireless mobile devices can receive the broadcast signal. The content access subsystem 30 would include a tuner for receiving the broadcast signal and storing the broadcast file in cache storage.

The operation of the content delivery system 19 is explained by the following illustrative example. A network operator, such as the operator of a network subsystem 17 desires to market content to a plurality of users having wireless mobile devices 13. Rather than sending point-to-point messages from the network subsystem 17, which would be costly for the users, a network operator arranges for a broadcast of the content by the broadcast content delivery subsystem 19. The receiver 21 in the wireless mobile device 13 receives the content broadcast and stores the content in a cache memory 31. The user may be informed of the content in a number of ways. For example, the content display subsystem 29 may display an advertising segment included in the content in the cache memory subsystem 31, at a predetermined time after receipt of the content. Alternately, the advertising segment may be displayed at random times, or after the completion of a cellular call on the wireless mobile device 13, or other events associated with the operation of the wireless mobile device 13. The content display subsystem 29 and the content access subsystem 30 may provide the user with the ability to purchase the content by executing specified commands on the wireless mobile device 13. For example, the owner of the rights to a song may arrange for delivery of the song to users of wireless mobile devices through broadcast content delivery subsystem 19 and network subsystem 17. The digital data associated with the song is stored in cache subsystem 31, come as previously stated, the user is provided with a segment of the song and is offered the option to purchase the song by providing instructions through the wireless mobile device 13. The instructions would be communicated wirelessly to the network subsystem 17. Once the purchase is processed through the order processing subsystem 54, the appropriate instructions are sent through the DRM subsystem 53 to the wireless mobile device 13. The instructions would "unlock" the entire song that can then be stored in a permanent storage in the wireless mobile device 13, so that the user may access and play the song as many times as the user wants. If on the other hand, the user chooses not to purchase a song, the content access subsystem 30 includes instructions to delete the digital data associated with a song from the cache memory subsystem 31 after a period of time.

Figure 2:
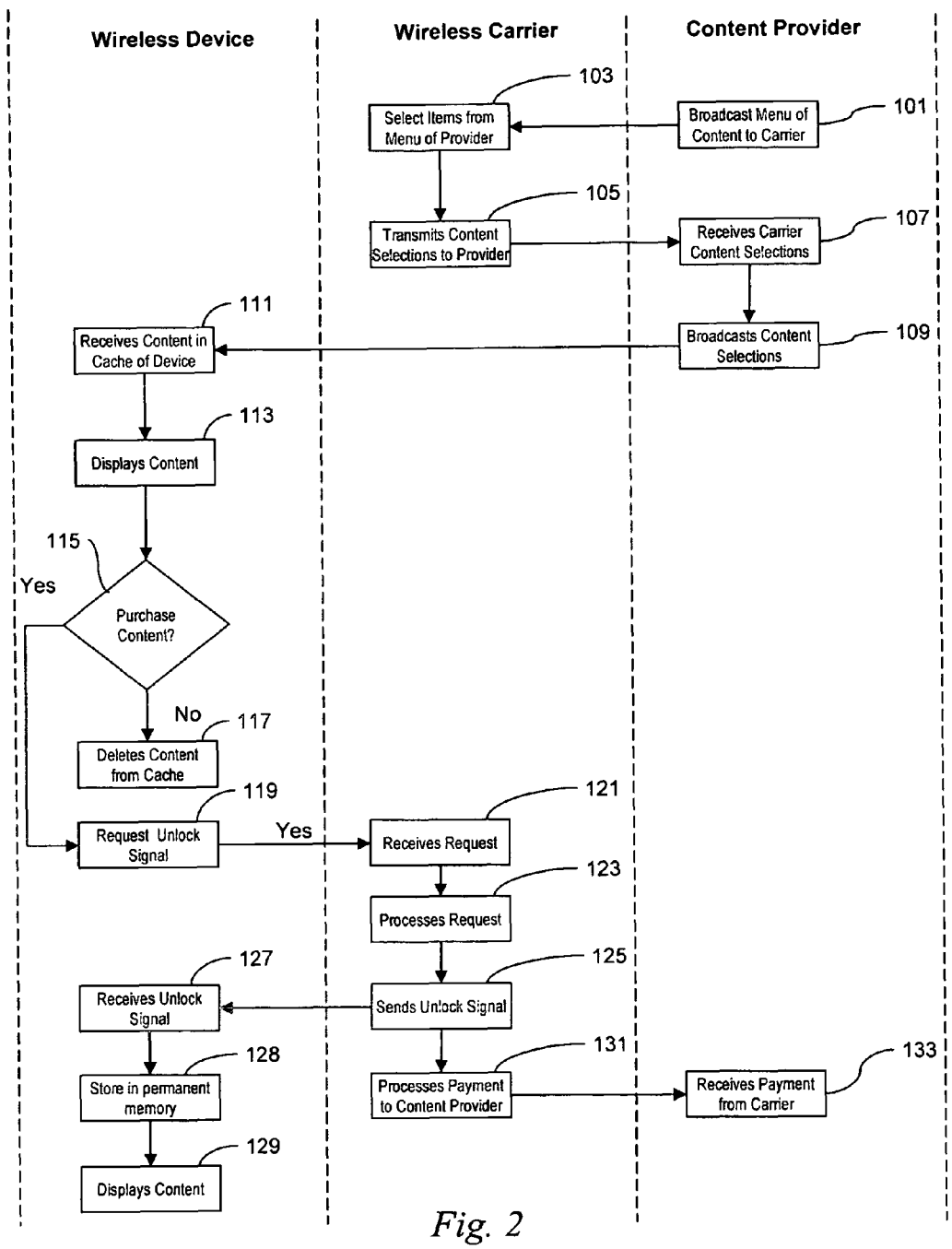
FIG. 2 illustrates a flow chart of a process for pre-caching broadcast content for merchandising on a wireless mobile device.

Illustrated in FIG. 2 is a flowchart of a process for pre-caching content to subscribers before displaying the content. Although the methodologies described in FIG. 2 are illustrated as a flowchart and are described as a series of acts, it should be understood that the invention is not limited by the order of the acts, in that some acts may occur in different order, may occur concurrently with other acts and not all of the illustrated acts may be necessary to implement a methodology in accordance with the invention.

FIG. 2 illustrates a representative methodology in accordance with the present invention as implemented by a wireless mobile device, a wireless carrier, and a content provider. In a typical wireless mobile devices, when the user powers up, the wireless mobile devices searches for a system identification code (SID) that has been assigned to the wireless carrier. This search is done in the control channel or spreading code on a frequency used by the wireless mobile devices and the base station. When the wireless mobile devices receives the SID, the wireless mobile devices compares its programmed SID. If the SIDs match, then the wireless mobile devices recognizes that the cell with which it is communicating is part of its home system. The wireless mobile device also transmits a registration request that the wireless carrier uses to keep track of the wireless mobile devices location in a database. The foregoing is the standard methodology used by wireless mobile devices such as cell phones during start up. With wireless mobile devices that have the capability of receiving multimedia content, the user is generally provided with a menu for the selection of the content.

The methodology described in FIG. 2 illustrates in embodiment, wherein a wireless carrier is offered content by a content provider for delivery to a wireless mobile device user. In method element 101 in FIG. 2 a content provider contacts a wireless carrier regarding selection of content from the provider's menu. For example there may be a selection to download ring tones, a Web browser to access a web site, a software or gaming program, or channels to receive in a broadcast. In method element 103 the wireless carrier selects items from the content provider's menu and sends the selection list to the content provider in method element 105. The content provider receives the content selections in method element 107. In method element 109, the content provider broadcasts the selections to subscribers in the wireless carrier's network. In method element 111, the wireless mobile device receives and stores the content in a cache memory. In method element 113, the wireless mobile device displays all or some of the content stored in the cache. For example, if the offered content is a movie trailer of the movie may be displayed. In the case of music or songs, the entire song may be played once. In method element (decision node) 115, the user is provided with the option to purchase the content. If the user does not purchase the content, then in method element 117, the wireless mobile devices deletes the preloaded information from the cache. If on the other hand, the user elects to purchase the content, then the wireless mobile device sends a request to the wireless carrier requesting an "unlock" signal for the content (method element 119). In method element 121, the wireless carrier receives the request from the user's device requesting an unlock signal for the content. In method element 123, the wireless carrier processes the request for the unlock signal. At method element 125, the wireless carrier performs two simultaneous functions. The wireless carrier sends the unlock signal to the wireless mobile devices where it is received by the wireless mobile devices in method element 127. The wireless device may then store the content in permanent memory in method element 128 and display the content when desired by the user in method element 129. In this example, the wireless carrier processes the payment for the content at method element 131, this may involve charging the user for the content, and processing a payment to the content provider where it is received at method element 133.

Other applications and variations of the methodology illustrated in FIG. 2, would be apparent to one of ordinary skill in the art. For example, instead of requesting an "unlock" signal in method element 119, the methodology may be configured so that this signal requested is an instruction not to delete the content after a period of time. In another embodiment if the user elects not to purchase the content, the user may be given a choice of continuing to store the content in cache for a period of time so a purchase decision can be made at a future time. Similarly, although FIGS. 1 and 2 illustrate the system and method as implemented with separate wireless carriers and content providers, it should be understood that the wireless carrier and content provider may be a single entity.

Although not every conceivable combination of components and methodologies for the purposes describing the present invention have been set out above, the examples provided will be sufficient to enable one of ordinary skill in the art to recognize the many combinations and permutations possible in respect of the present invention. Accordingly, this disclosure is intended to embrace all such alterations, modifications and variations that fall within the spirit and scope of the appended claims. For example, although the multimedia examples provided above deal primarily in the context of video and television, any sort of multimedia content such as audio, music, software, entertainment software, satellite radio and satellite television are encompassed within the concept of multimedia. Similarly, the concept of displaying content includes playing ring tones or other audio signals in addition to displaying visual displays.

What is claimed:

1. A method comprising:
   receiving, by a wireless mobile device, via a wireless broadcast signal, encrypted full content, the encrypted full content being indicative of having been selected by a wireless carrier network operator;
   storing the encrypted full content in a cache memory of the wireless mobile device;
   subsequent to receiving the encrypted full content, providing, via the wireless mobile device, an indication of the encrypted full content;
   providing, via the wireless mobile device, an option to purchase rights to display unencrypted content of the encrypted full content;
   receiving an indication of a decision pertaining to the option to purchase;
   providing an indication of the decision;

if the decision is to purchase user purchases the rights:
  receiving instructions to provide access to the encrypted full content and
  storing the encrypted full content in a permanent memory in the wireless mobile device; and
if the decision is to not purchase the rights:
  deleting, upon expiration of a predetermined amount of time, the encrypted full content from the cache memory.

2. The method of claim 1 further comprising:
if the decision is to not purchase the rights, providing, via the wireless mobile device, an option to keep the encrypted full content stored in cache memory for a later purchase.

3. The method of claim 1 further comprising:
displaying, via the wireless mobile device, a purchase price for the encrypted full content; and
providing, via the wireless mobile device, a mechanism for accepting the purchase price and initiating execution of the encrypted full content.

4. A wireless mobile device comprising:
a processor; and
memory coupled to the processor, the memory comprising executable instructions that when executed by the processor cause the processor to effectuate operations comprising:
  receiving, via a wireless broadcast signal, encrypted full content, the encrypted full content being indicative of having been selected by a wireless carrier network operator
  storing the encrypted full content in a cache memory of the wireless mobile device;
  subsequent to receiving the encrypted full content, providing an indication of the encrypted full content stored in the cache memory;
  providing an option to purchase rights to the encrypted full content via the wireless mobile device;
  receiving an indication of a decision pertaining to the option to purchase;
  providing an indication of the decision;
  if the decision is to purchase the rights:
    receiving instructions to provide access to the encrypted full content stored in the wireless mobile device; and
    storing the encrypted full content in a permanent memory of the wireless mobile device; and
  if the decision is to not purchase the rights:
    deleting, upon expiration of a predetermined amount of time, the encrypted full content from the cache memory.

5. The wireless mobile device of claim 4 further comprising:
if the decision is to not purchase the rights, providing, via the wireless mobile device, an option to keep the encrypted full content stored in the cache memory for a later purchase.

6. The wireless mobile device of claim 4 further comprising:
displaying, via the wireless mobile device, a purchase price for the rights to the encrypted full content; and
providing, via the wireless mobile device, a mechanism for accepting the purchase price and initiating execution of the encrypted full content.

7. A tangible computer readable storage medium comprising computer-readable instructions that when executed by a processor cause the processor to effectuate operations comprising:
  receiving, by a wireless mobile device, via a wireless broadcast signal, encrypted full content, the encrypted full content being indicative of having been selected by a wireless carrier network operator;
  storing the encrypted full content in a cache memory of the wireless mobile device;
  subsequent to receiving the encrypted full content, providing, via the wireless mobile device, an indication of the encrypted full content stored in the cache memory;
  providing, via the wireless mobile device, an option to purchase the rights to the encrypted full content;
  receiving an indication of a decision pertaining to the option to purchase;
  providing an indication of the decision;
  if the decision is to purchase the rights:
    receiving instructions to provide access to the encrypted full content stored in the wireless mobile device; and
    storing the encrypted full content in a permanent memory of the wireless mobile device; and
  if the decision is to not purchase the rights:
    deleting, upon expiration of a predetermined amount of time, the encrypted full content from the cache memory.

8. The tangible computer readable storage medium of claim 7, the operations further comprising:
if the decision is to not purchase the rights, providing, via the wireless mobile device, an option to keep the encrypted content stored in cache memory for a later purchase.

9. The tangible computer-readable storage medium of claim 7, the operations further comprising:
displaying, via the wireless mobile device, a purchase price for the encrypted full content; and
providing, via the wireless mobile device, a mechanism for accepting the purchase price and initiating execution of the encrypted full content.

* * * * *